US010239560B2

(12) United States Patent
Tomikuda et al.

(10) Patent No.: US 10,239,560 B2
(45) Date of Patent: Mar. 26, 2019

(54) SUBFRAME FOR VEHICLE (71) Applicants: F-TECH INC., Kuki, Saitama (JP); HONDA MOTOR CO., LTD., Tokyo (JP)

(72) Inventors: Norio Tomikuda, Tochigi (JP); Takuya Tsurumi, Tochigi (JP); Tomoyuki Imanishi, Wako (JP)

(73) Assignees: F-TECH INC., Kuki (JP); HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 15/102,451

(22) PCT Filed: Dec. 9, 2014

(86) PCT No.: PCT/JP2014/082543
§ 371 (c)(1),
(2) Date: Nov. 21, 2016

(87) PCT Pub. No.: WO2015/087874
PCT Pub. Date: Jun. 18, 2015

(65) Prior Publication Data
US 2017/0120953 A1    May 4, 2017

(30) Foreign Application Priority Data
Dec. 13, 2013  (JP) ................. 2013-258344

(51) Int. Cl.
| B62D 21/15 | (2006.01) |
| B62D 21/11 | (2006.01) |
| B62D 29/00 | (2006.01) |
| B62D 27/02 | (2006.01) |

(52) U.S. Cl.
CPC ............ B62D 21/155 (2013.01); B62D 21/11 (2013.01); *B62D 27/023* (2013.01); *B62D 29/007* (2013.01)

(58) Field of Classification Search
CPC .... B62D 21/155; B62D 21/11; B62D 29/007; B62D 27/023
See application file for complete search history.

(56) References Cited

FOREIGN PATENT DOCUMENTS

| JP | 11-180334 A | 7/1999 |
| JP | 2000-6833 A | 1/2000 |
| JP | 2000-118435 A | 4/2000 |
| JP | 2005-206121 A | 8/2005 |
| JP | 2013-6518 A | 1/2013 |
| JP | 2013-119313 A | 6/2013 |

OTHER PUBLICATIONS

International Search Report dated Mar. 3, 2015, issued in counterpart Application No. PCT/JP2014/082543 (2 pages).

*Primary Examiner* — Paul N Dickson
*Assistant Examiner* — Joselynn Y Sliteris
(74) *Attorney, Agent, or Firm* — Westerman, Hattori, Daniels & Adrian, LLP (57) ABSTRACT

There is provided a vehicle subframe (1) in which a projecting portion (24, 31) of a front member (20) extends upward, while projecting from a body portion in a width direction, to have an upper end (25, 32), and exhibits a convex shape toward a front side, with the upper end (25, 32) functioning as a front attachment portion to a vehicle body, in such a manner that support stiffness of a suspension can be improved, while ensuring favorable productivity, high strength, and the like, with a simple configuration.

16 Claims, 5 Drawing Sheets

SUBFRAME FOR VEHICLE

TECHNICAL FIELD

The present invention relates to a vehicle subframe, and more particularly relates to a vehicle subframe that supports a suspension arm or the like and is mounted on a body of a vehicle such as an automobile.

BACKGROUND ART

In recent years, various external-force application members such as suspension-related components such as a suspension arm and a stabilizer, steering-related components such as a steering gearbox, and mounting-related components of an engine transmission system are mounted on a vehicle subframe of an automobile or the like.

Therefore, it is required to further increase strength and stiffness of the subframe, while improving productivity thereof.

Under such circumstances, Patent Document 1 relates to a front suspension member and discloses a configuration in which a reinforcing panel arranged between an upper panel and a lower panel is provided in order to increase stiffness with respect to a load in a horizontal direction from a suspension arm and a load in a vertical direction from an engine mount, so that complexity of production can be resolved while reducing the number of components.

PRIOR ART DOCUMENT

Patent Document

Patent Document 1: Japanese Patent Application Laid-open Publication No. 2000-118435

SUMMARY OF THE INVENTION

Problem to be Solved by the Invention

However, according to studies made by the present inventors, in the configuration of the front suspension member in Patent Document 1, the reinforcing panel has a shape extending across a first attachment portion and a second attachment portion provided on the right and left respectively and a third attachment portion therebetween, the upper panel has a shape extending across the first attachment portion and the third attachment portion, and the lower panel has a shape extending across the second attachment portion and the third attachment portion. Therefore, the panel becomes large to increase the weight, and the cost tends to increase also for production of the panel.

Further, according to studies made by the present inventors, in the configuration of Patent Document 1, if the front suspension member is applied to a vehicle having a large difference in height between the first attachment portion and the second attachment portion, it may adversely increase the draw depth particularly of the reinforcing panel and the upper panel, thereby inhibiting mass production.

The present invention has been achieved in view of the above problems, and an object of the present invention is to provide a vehicle subframe that can improve support stiffness of a suspension, while ensuring favorable productivity, high strength, and the like, with a simple configuration.

Means For Solving The Problem

To achieve the above object, a first aspect of the present invention is to provide a vehicle subframe including: a lower member being a plate-like member located on a lower side of a vehicle body; an upper member being a plate-like member facing the lower member on an upper side of the vehicle body; and a front member being a plate-like member located on the front side of the vehicle body of the lower member and the upper member. Here, the front member is intervened between an end on the front side of the vehicle body of the lower member and an end on the front side of the upper member to connect therebetween, and an end on a rear side of the vehicle body of the lower member and an end on the rear side of the upper member are connected with each other, to constitute a body portion exhibiting a closed sectional shape closed in a front-rear direction and in a vertical direction of the vehicle body, the front member includes a pair of right and left projecting portions projecting from the body portion in a width direction of the vehicle body, and each of the projecting portions extends toward the upper side, while projecting from the body portion in the width direction, to have an upper end, and exhibits a convex shape to the front side, with the upper end functioning as a front attachment portion to the vehicle body.

According to a second aspect of the present invention, in addition to the first aspect, each of the projecting portions includes an upper wall having the upper end, a lower wall facing the upper wall portion, and a side wall connecting the upper wall and the lower wall, and respective ends of the upper wall, the lower wall, and the side wall of each of the projecting portions are connected to a reinforcing member connected to the body portion, to form a closed cross section.

According to a third aspect of the present invention, in addition to the second aspect, a coupling member is further provided between the front attachment portion and the vehicle body, and the coupling member includes a notched portion for fastening with the vehicle body, formed so as to be open downward.

According to a fourth aspect of the present invention, in addition to any of the first to third aspects, the projecting portion includes a vertical wall portion on the front side, and the vertical wall portion and a support member provided in a protruding manner from the body portion toward the front side constitute a front support portion that supports a suspension arm.

According to a fifth aspect of the present invention, in addition to the fourth aspect, an external-force receiving member is further provided in a protruding manner from the support member toward the front side.

According to a sixth aspect of the present invention, in addition to any of the first to fifth aspects, the upper member and the lower member are cooperatively to constitute a rear attachment portion being an attachment portion to the vehicle body on the rear side, and a rear support portion being a support portion of the suspension arm on the rear side.

According to a seventh aspect of the present invention, in addition to the sixth aspect, a spacer member arranged across the rear attachment portion and the rear support portion is further provided. Here, the spacer member includes a first collar portion arranged in the rear attachment portion, a second collar portion arranged in the rear support portion, and a coupling portion that couples the first collar portion and the second collar portion.

According to an eighth aspect of the present invention, in addition to the sixth or seventh aspect, a connection member is further provided between the rear support portion and the vehicle body, and the suspension arm is supported by the rear support portion and the connection member.

According to a ninth aspect of the present invention, in addition to any of the first to eighth aspects, the upper member further includes a dent portion for routing a stabilizer, which is provided by depressing the upper member downward.

Effect of the Invention

According to the configuration of the first aspect of the present invention, each of the projecting portions of the front member extends upward, while projecting from the vehicle body in the width direction, to have the upper end, and exhibits a convex shape to the front side. The upper end functions as the front attachment portion to the vehicle body. Consequently, support stiffness of the suspension can be improved, while ensuring favorable productivity, high strength, and the like, with a simple configuration.

According to the configuration of the second aspect of the present invention, the respective ends of the upper wall, the lower wall, and the side walls of each of the projecting portions are connected to the reinforcing member connected to the body portion, to form the closed cross section. Consequently, support stiffness of the suspension can be improved, while ensuring favorable productivity, high strength, and the like, with a simple configuration.

According to the configuration of the third aspect of the present invention, the coupling member provided between the front attachment portion and the vehicle body includes the notched portion for fastening with the vehicle body, formed so as to be open downward. Consequently, at the time of frontal collision of the vehicle, the fastening member moves along the notched portion, and the front attachment portion can move correspondingly downward of the vehicle. Therefore, it can be suppressed that the subframe unnecessarily thrusts into a vehicle interior.

According to the configuration of the fourth aspect of the present invention, the projecting portion includes the vertical wall portion on the front side, and the vertical wall portion and the support member provided in a protruding manner from the body portion toward the front side constitute the front support portion that supports the suspension arm. Consequently, the support portion that supports the suspension arm can be constituted, while improving support stiffness of the suspension arm with a simple configuration. If the front support portion is respectively provided on the right and left sides, an input load from the vehicle front side at the time of frontal collision of the vehicle can be evenly received by these support portions, and a deformation mode of the right and left portions of the subframe can be equalized.

According to the configuration of the fifth aspect of the present invention, because the external-force receiving member provided in a protruding manner from the support member toward the front side is further provided, an input load from the vehicle front side at the time of frontal collision of the vehicle is absorbed by the external-force receiving member. Consequently, the input load that is transmitted to the subframe at the rear side thereof can be reduced.

According to the configuration of the sixth aspect of the present invention, the upper member and the lower member are cooperatively to constitute the rear attachment portion being the attachment portion to the vehicle body on the rear side, and the rear support portion being the support portion of the suspension arm on the rear side. Consequently, attachment stiffness of the subframe and support stiffness of the suspension arm can be increased.

According to the configuration of the seventh aspect of the present invention, the spacer member includes the first collar portion arranged in the rear attachment portion, the second collar portion arranged in the rear support portion, and the coupling portion that couples the first collar portion and the second collar portion. Consequently, stiffness and strength of the subframe between the rear attachment portion and the rear support portion of the subframe can be improved. Further, at the time of collision of the vehicle, deformation of the subframe portion between the rear attachment portion and the rear support portion of the subframe can be suppressed, and occurrence of such a circumstance that when the rear support portion drops off downward, the deformation interrupts drop-off thereof can be suppressed.

According to the configuration of the eighth aspect of the present invention, the suspension arm is supported by the rear support portion and the connection member provided between the rear support portion and the vehicle body. Consequently, attachment stiffness of the suspension arm can be further improved.

According to the configuration of the ninth aspect of the present invention, the upper member further includes the dent portion for routing the stabilizer, which is provided by depressing the upper member toward the lower side. Accordingly, the stabilizer can be routed in the dent portion, and a steering gearbox can be arranged above the stabilizer. Consequently, the stabilizer and the steering gearbox can be attached to the subframe, while preventing interference with peripheral components.

EMBODIMENT FOR CARRYING OUT THE INVENTION

A vehicle subframe according to an embodiment of the present invention is explained in detail below with reference to FIGS. 1 to 5 as appropriate. In the drawings, an x-axis, a y-axis, and a z-axis form a three-dimensional orthogonal coordinate system. A positive direction of the x-axis is a rear direction of a vehicle body, a positive direction of the y-axis is a right direction of the vehicle body, and a positive direction of the z-axis an upper direction of the vehicle body. The x-axis direction may be referred to as "longitudinal direction", and the y-axis direction may be referred to as "width direction".

(Overall Configuration of Vehicle Subframe)

Figure 2:
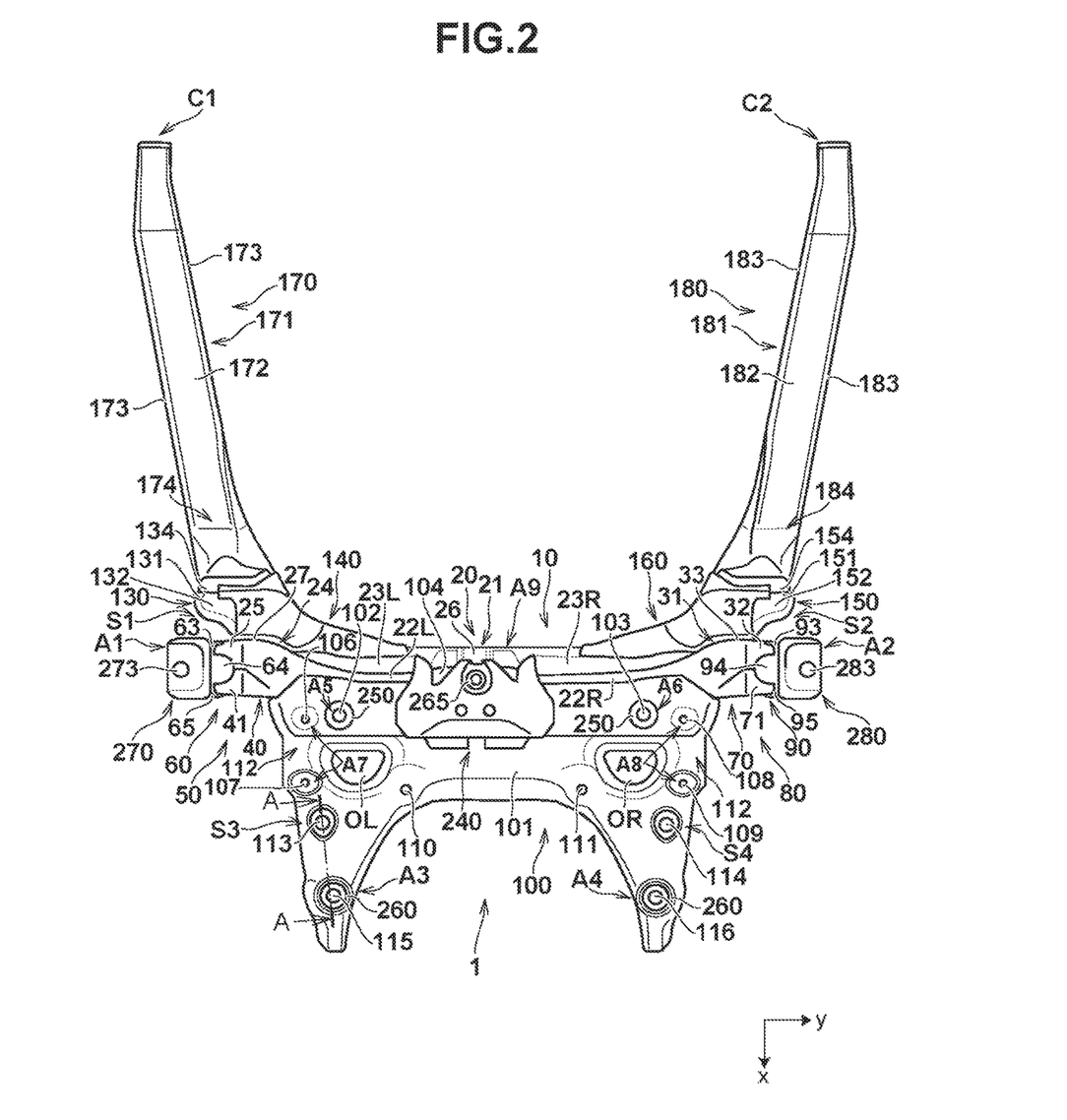
FIG. 2 is a plan view of the vehicle subframe according to the embodiment.
Figure 3:
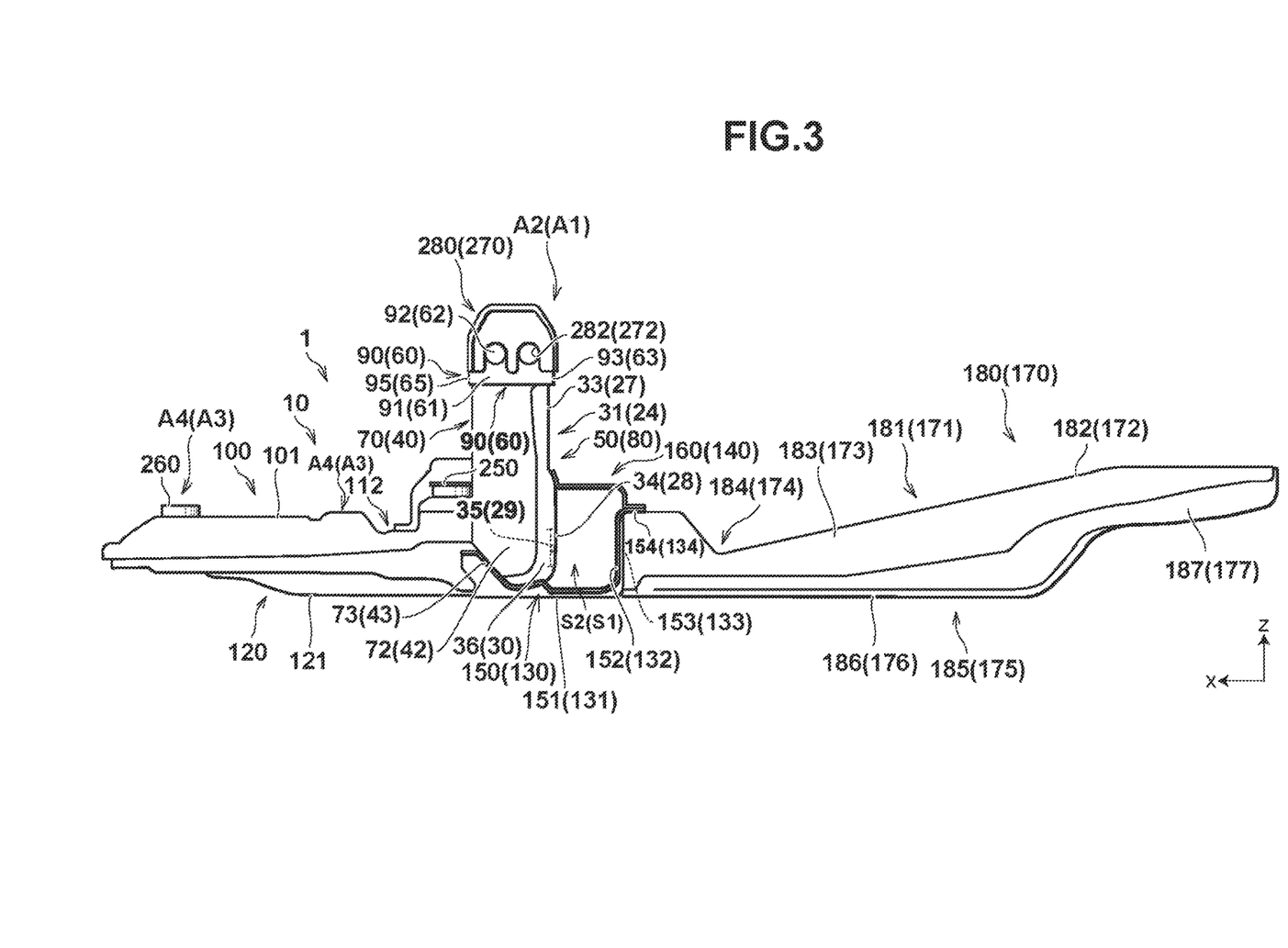
FIG. 3 is a side view of the vehicle subframe according to the embodiment.

An overall configuration of a vehicle subframe according to the present embodiment is described in detail with reference to FIGS. 1 to 3.

Figure 1:
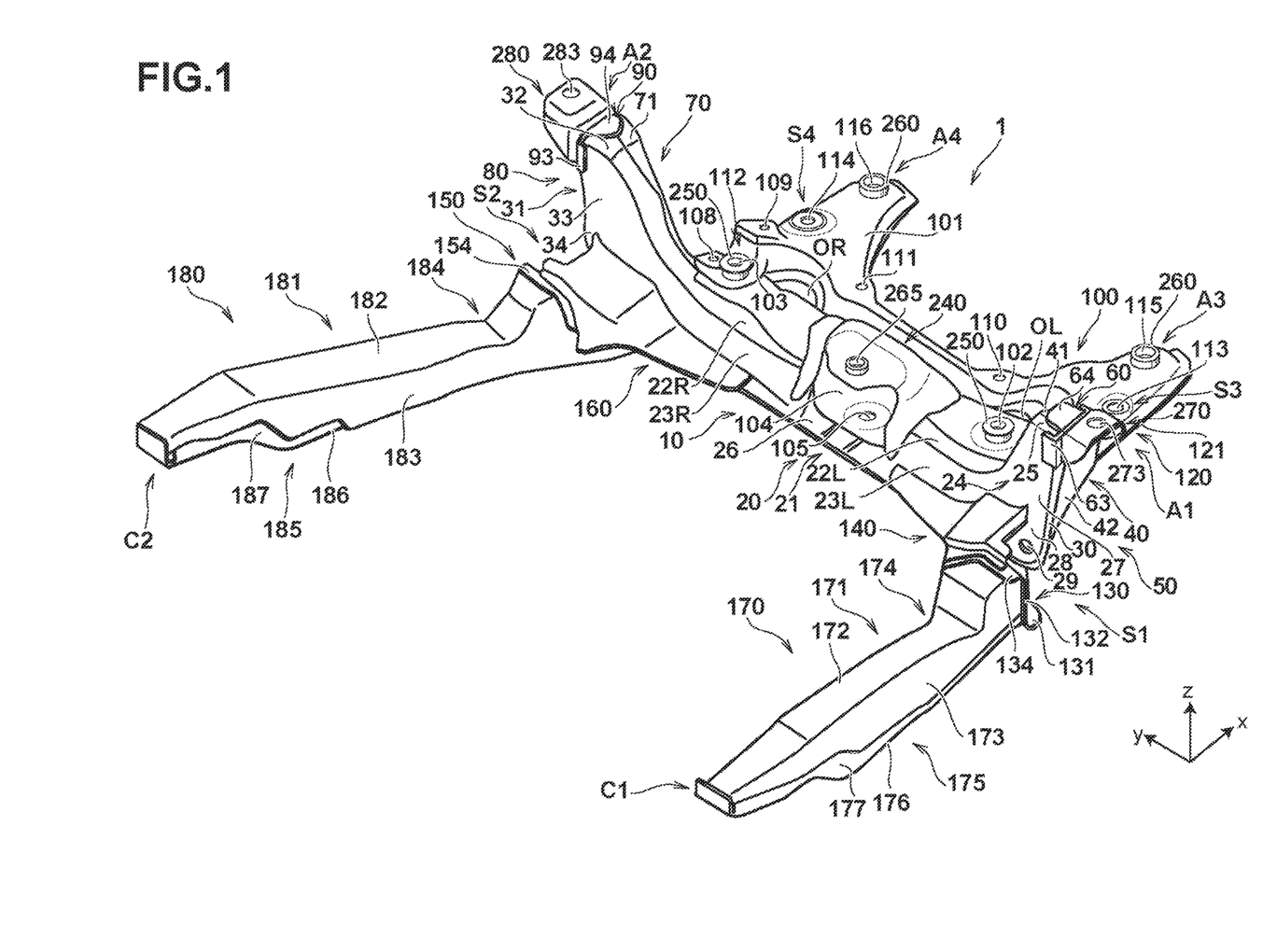
FIG. 1 is a perspective view of a vehicle subframe according to an embodiment of the present invention.
Figure 4:
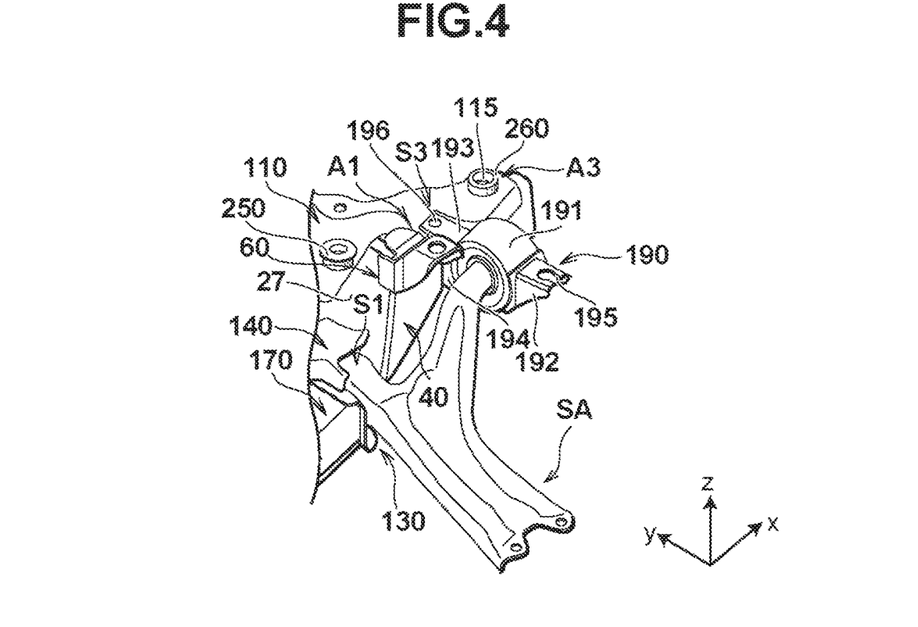
FIG. 4 is a partially enlarged perspective view of the vehicle subframe according to the embodiment.
Figure 5A:
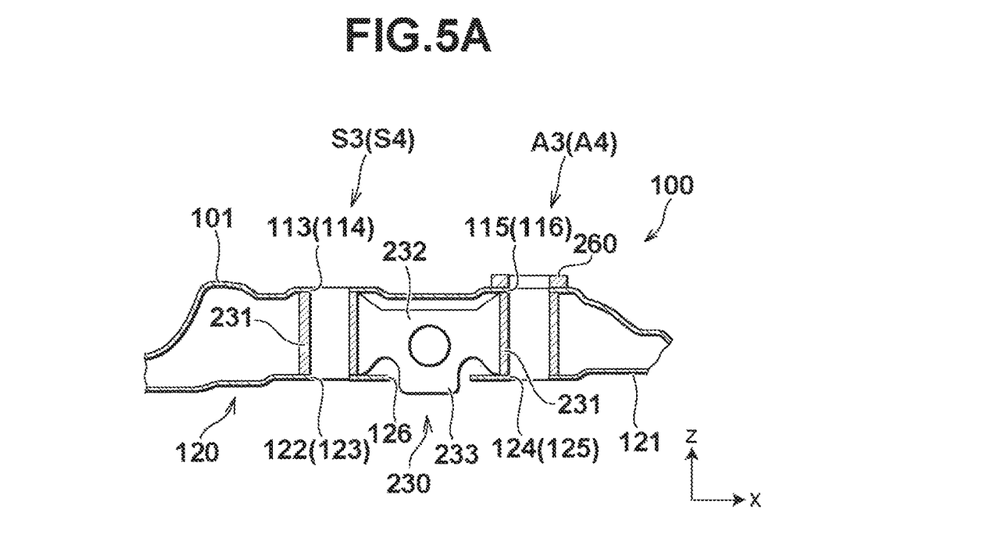
FIG. 5A is an enlarged sectional view along a line A-A in FIG. 2.
Figure 5B:
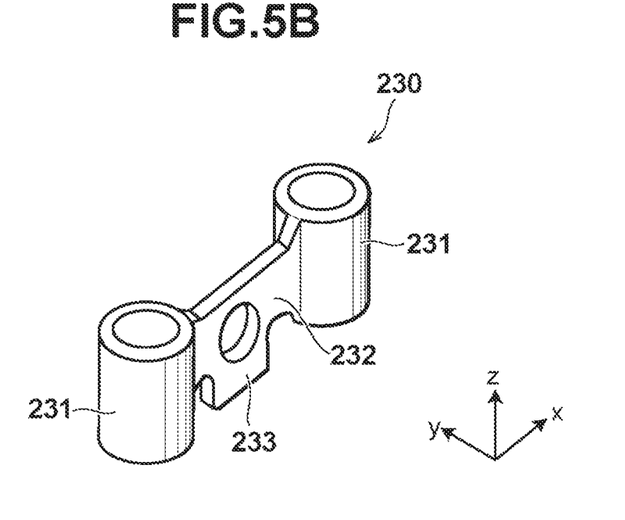
FIG. 5B is an enlarged perspective view of a spacer member used for the vehicle subframe according to the embodiment.

FIG. 1 is a perspective view of the vehicle subframe according to the present embodiment. FIG. 2 is a plan view of the vehicle subframe according to the present embodiment. FIG. 3 is a side view of the vehicle subframe according to the present embodiment. FIG. 4 is a partially enlarged perspective view of the vehicle subframe according to the present embodiment. FIG. 5A is an enlarged sectional view along a line A-A in FIG. 2. FIG. 5B is an enlarged perspective view of a spacer member used for the vehicle subframe according to the present embodiment. FIG. 3 is a right side view of the vehicle subframe according to the present embodiment. However, reference characters to be shown in a left side view are also shown appropriately in parentheses. FIG. 4 mainly shows a suspension arm on the left side and an attachment configuration thereof. However, the suspension arm on the right side and the attachment configuration thereof have a bilaterally symmetric configuration with respect to a suspension arm SA on the left side. FIG. 5A is a sectional view mainly showing a left rear attachment hole and a left-rear through hole. However, a right-rear attachment hole and a right-rear through hole are also shown with reference characters in parentheses.

As shown in FIGS. 1 to 5, a subframe mainly has various constituent elements acquired typically by press-molding a flat-plate member such as a steel plate, and particularly supports the suspension arm SA shown in FIG. 4, while being mounted on a vehicle body such as a front side frame that defines a front engine bay of the vehicle such as an automobile (both not shown). Typically, the subframe 1 basically has a bilaterally symmetric shape with respect to a plane parallel to an x-z plane and passing the center in the width direction of the vehicle body.

Specifically, the subframe 1 includes a body portion 10 typically having a box-shaped closed cross-sectional structure. The body portion 10 includes a front member 20, an upper member 100, and a lower member 120, which are welded and integrated with each other typically by arc welding or the like. The lower member 120 and the upper member 100 face each other in a vertical direction, and the front member 20 is located on the front side of the lower member 120 and the upper member 100.

In the body portion 10, the front member 20 connects between a front end of the lower member 120 and a front end of the upper member 100, and a rear end of the lower member 120 and a rear end of the upper member 100 are connected with each other to form a closed cross-sectional shape, which is closed in a front-rear direction and the vertical direction.

Configurations of the front member 20, the upper member 100, and the lower member 120 are described in detail in order from the front member 20.

<Configuration of Front Member>

The front member 20 includes an upper left wall portion 22L and an upper right wall portion 22R on the right and left sides located on the upper side and extending in the width direction, a central portion 21 having wall portions 23L and 23R continuous to the front ends of the upper left wall portion 22L and the upper right wall portion 22R correspondingly and extending, while descending forward, and a front concave portion 26 located between the wall portions 23L and 23R in the width direction and provided by being depressed downward, a left projecting portion 24 projecting leftward from the upper left wall portion 22L, and a right projecting portion 31 projecting rightward from the upper right wall portion 22R. In FIGS. 1 and 2, the central portion 21 is arranged deviated to the left side. This is due to the layout of an engine transmission system (not shown) of the vehicle, and the central portion 21 can be arranged at the center in the width direction without being deviated, or can be arranged deviated to the right side, according to the layout.

The left projecting portion 24 includes a vertical wall portion 27 continuous to the left end of the upper left wall portion 22L and projecting leftward, with an upper end thereof ascending as approaching leftward, an upper wall portion 25 continuous to the upper end of the vertical wall portion 27 and extending rearward, a left-end vertical wall portion 28 being a lower left portion of the vertical wall portion 27 and having an attachment hole 29 for attachment of a left-front pivot of a front suspension system in the suspension arm SA, passing completely therethrough in the front-rear direction, and a wall portion 30 continuous to respective ends on the left side of the vertical wall portion 27, and the left side and the lower side of the left-end vertical wall portion 28 to extend rearward, and functioning as a lower wall and a side wall. Further, the right projecting portion 31 includes a vertical wall portion 33 continuous to the right end of the upper right wall portion 22R and projecting rightward, with an upper end thereof ascending as approaching rightward, an upper wall portion 32 continuous to the upper end of the vertical wall portion 33 and extending rearward, a right-end vertical wall portion 34 being a lower right portion of the vertical wall portion 33 and having an attachment hole 35 for attachment of a right-front pivot of the front suspension system in the suspension arm SA, passing completely therethrough in the front-rear direction, and a wall portion 36 continuous to respective ends on the right side of the vertical wall portion 33, and the right side and the lower side of the right-end vertical wall portion 34 to extend rearward, and functioning as a lower wall and a side wall. That is, the left projecting portion 24 and the right projecting portion 31 constitute projecting portions projecting from the body portion 10 in the horizontal direction respectively correspondingly, and the projecting portion has a convex shape to the front.

A left reinforcing member 40 that includes an upper wall portion 41 located on an upper side thereof, a vertical wall portion 42 continuous to the upper wall portion 41 to extend downward and located on the left side and the rear side thereof, and a lower wall portion 43 continuous to the upper wall portion 41 and the vertical wall portion 42 and located on a lower side thereof, and has a substantially U-shape in cross section is arranged with respect to the left projecting portion 24, facing each other.

The upper wall portion 25 of the left projecting portion 24 is correspondingly welded to the upper wall portion 41 of the left reinforcing member 40 typically by arc welding or the like, and the wall portion 30 of the left projecting portion 24 is correspondingly welded to the vertical wall portion 42 and the lower wall portion 43 of the left reinforcing member 40 typically by arc welding or the like, thereby defining a left box-shaped portion 50 having a closed cross-sectional shape. If required strength is ensured only by the left projecting portion 24, the left box-shaped portion 50 can be configured only by the left projecting portion 24 without using the left reinforcing member 40.

With respect to the left box-shaped portion 50, a left auxiliary member 60 including a vertical wall portion 61 closely facing a left vertical wall portion of the left box-shaped portion 50 and having an attachment hole 62 passing completely therethrough in a horizontal direction, a front flange 63 continuous to a front end of the vertical wall portion 61 and extending rightward, an upper flange 64 continuous to an upper end of the vertical wall portion 61 and extending rightward, and a rear flange 65 continuous to a rear end of the vertical wall portion 61 and extending rightward is welded typically by arc welding or the like and fixed.

Further, with respect to the left box-shaped portion 50, a left coupling member 270 including a vertical wall portion having a notched portion 272 extending in the vertical direction to open downward, and passing completely therethrough in the horizontal direction, an upper wall portion continuous to an upper end of the vertical wall portion to extend leftward and having an attachment hole 273 passing completely therethrough in the vertical direction, and a pair of side wall portions respectively continuous to right and left ends of the vertical wall portion is mounted thereon. In terms of improvement of attachment stiffness of the subframe 1 with respect to members on the vehicle body side, it is desired that a plurality of notched portions 272 are arranged in parallel in the front-rear direction.

The left coupling member 270 having the above configuration is mounted on the left box-shaped portion 50 by a fastening member such as a bolt (not shown) via the attachment hole 62 of the left auxiliary member 60. A collar member (not shown) can be joined to the attachment hole 273 to fasten the left coupling member 270 to the members on the vehicle body side by the fastening member via the collar member. If an attachment position of the member on the vehicle body side, to which the subframe 1 is to be attached, is low, the left coupling member 270 can be omitted. If the left coupling member 270 is omitted, the attachment hole only needs to be provided at an upper end of the left box-shaped portion 50, and the collar member can be provided to the attachment hole similarly.

Aright reinforcing member 70 that includes an upper wall portion 71 located on an upper side thereof, a vertical wall portion 72 continuous to the upper wall portion 71 to extend downward and located on the right side to the rear side thereof, and a lower wall portion 73 continuous to the upper wall portion 71 and the vertical wall portion 72 and located on a lower side thereof, and has a substantially U-shape in cross section is arranged with respect to the right projecting portion 31, facing each other.

The upper wall portion 32 of the right projecting portion 31 is correspondingly welded to the upper wall portion 71 of the right reinforcing member 70 typically by arc welding or the like, and the wall portion 36 of the right projecting portion 31 is correspondingly welded to the vertical wall portion 72 and the lower wall portion 73 of the right reinforcing member 70 typically by arc welding or the like, thereby defining a right box-shaped portion 80 having a closed cross-sectional shape. If required strength is ensured only by the right projecting portion 31, the right box-shaped portion 80 can be configured only by the right projecting portion 31 without using the right reinforcing member 70.

With respect to the right box-shaped portion 80, a right auxiliary member 90 including a vertical wall portion 91 closely facing a right vertical wall portion of the right box-shaped portion 80 and having an attachment hole 92 passing completely therethrough in the horizontal direction, a front flange 93 continuous to a front end of the vertical wall portion 91 and extending leftward, an upper flange 94 continuous to an upper end of the vertical wall portion 91 and extending leftward, and a rear flange 95 continuous to a rear end of the vertical wall portion 91 and extending leftward is welded typically by arc welding or the like and fixed.

Further, with respect to the right box-shaped portion 80, a right coupling member 280 including a vertical wall portion having a notched portion 282 extending in the vertical direction to open downward and passing completely therethrough in the horizontal direction, an upper wall portion continuous to an upper end of the vertical wall portion to extend rightward and having an attachment hole 283 passing completely therethrough in the vertical direction, and a pair of side wall portions respectively continuous to right and left ends of the vertical wall portion is mounted thereon. In terms of improvement of attachment stiffness of the subframe 1 with respect to the members on the vehicle body side, it is desired that a plurality of notched portions 282 are arranged in parallel in the front-rear direction.

The right coupling member 280 having the above configuration is mounted on the right box-shaped portion 80 by a fastening member such as a bolt (not shown) via the attachment hole 92 of the right auxiliary member 90. A collar member (not shown) can be joined to the attachment hole 283 to fasten the right coupling member 280 to the members on the vehicle body side by the fastening member via the collar member. If an attachment position of the member on the vehicle body side, to which the subframe 1 is to be attached, is low, the right coupling member 280 can be omitted. If the right coupling member 280 is omitted, the attachment hole only needs to be provided at an upper end of the right box-shaped portion 80, and the collar member can be provided to the attachment hole similarly.

In the front member 20, a left bracket 140 is welded to the wall portion 23L and the vertical wall portion 27 typically by arc welding or the like, and a right bracket 160 is welded to the wall portion 23R and the vertical wall portion 33 typically by arc welding or the like.

<Configuration of Upper Member>

The upper member 100 has a basic shape projecting upward. In the upper member 100, a front end thereof is welded to a rear end of the central portion 21 of the front member 20 and rear ends of the upper left wall portion 22L and the upper right wall portion 22R on the right and left sides typically by arc welding or the like, and a rear end thereof is welded to the rear end of the lower member 120 typically by arc welding or the like.

A center front portion of an upper wall portion 101 of the upper member 100 includes a front concave portion 104 provided by being depressed downward, while extending forward between the upper left wall portion 22L and the upper right wall portion 22R on the right and left sides of the front member 20 and having a front-middle attachment hole 105 passing completely therethrough in the vertical direction. A front end of the front concave portion 104 is welded to a rear end of the front concave portion 26 of the front member 20 typically by arc welding or the like.

A mounting bracket 240 typically made of metal such as a steel plate, which is fixedly arranged by welding a nut member 265 thereto typically by arc welding or the like, is fixedly arranged on an upper surface of the front concave portion 104 typically by arc welding or the like. A part of the mounting bracket 240 can be welded to the right and left wall portions 23R and 23L located on opposite sides of the front concave portion 26 of the front member 20.

The upper wall portion 101 is provided with a left-front through hole 102 passing completely through a left front portion of the upper wall portion 101 in the vertical direction and having a collar member 250 arranged thereto, and a right-front through hole 103 passing completely through a right front portion thereof in the vertical direction and having the collar member 250 arranged thereto. The collar member 250 is fixedly arranged to the left-front through hole 102 and the right-front through hole 103 respectively correspondingly, by being welded thereto typically by arc welding or the like.

On the left side of the left-front through hole 102, a left-front attachment hole 106 and a left-middle attachment hole 107 that pass completely through the upper wall portion 101 in the vertical direction and are juxtaposed to each other at the front and rear? are provided. On the right side of the right-front through hole 103, a right-front attachment hole 108 and a right-middle attachment hole 109 that pass completely through the upper wall portion 101 in the vertical direction and are juxtaposed to each other at the front and rear are provided.

In a region having an area between the left-front attachment hole 106 and the left-middle attachment hole 107 and an area between the right-front attachment hole 108 and the right-middle attachment hole 109 therebetween in the front-rear direction, a rear concave portion 112 is respectively formed by depressing the upper wall portion 101 downward.

On the right side of the left-middle attachment hole 107, a middle-left attachment hole 110 passing completely through the upper wall portion 101 in the vertical direction is provided. On the left side of the right-middle attachment hole 109, a middle-right attachment hole 111 passing completely through the upper wall portion 101 in the vertical direction is provided.

On the rear side of the left-middle attachment hole 107, a left-rear attachment hole 113 passing completely through the upper wall portion 101 in the vertical direction is provided. On the rear side of the right-middle attachment hole 109, a right-rear attachment hole 114 passing completely through the upper wall portion 101 in the vertical direction is provided.

On the rear side of the left-rear attachment hole 113, a left-rear through hole 115 passing completely through the upper wall portion 101 in the vertical direction and provided with a collar member 260 is provided. On the rear side of the right-rear attachment hole 114, a right-rear through hole 116 passing completely through the upper wall portion 101 in the vertical direction and provided with the collar member 260 is provided. The collar member 260 is fixedly arranged to the left-rear through hole 115 and the right-rear through hole 116 respectively correspondingly, by being welded thereto typically by arc welding or the like.

<Configuration of Lower Member>

The lower member 120 has a basic shape projecting downward. In the lower member 120, a front end thereof is welded to a lower end of the central portion 21 of the front member 20 typically by arc welding or the like, and a rear end thereof is welded to the rear end of the upper member 100 typically by arc welding or the like.

The lower member 120 is provided with a left-rear attachment hole 122 facing the left-rear attachment hole 113 of the upper member 100 below thereof, a right-rear attachment hole 123 facing the right-rear attachment hole 114 of the upper member 100 below thereof, a left-rear through hole 124 facing the left-rear through hole 115 of the upper member 100 below thereof, and a right-rear through hole 125 facing the right-rear through hole 116 of the upper member 100 below thereof, which are through holes passing completely through a bottom wall portion 121 of the lower member 120 in the vertical direction.

A left support member 130 provided in a protruding manner toward the front of the vehicle is welded to a left front end of the lower member 120 typically by arc welding or the like. The left support member 130 includes a vertical wall portion 132 extending upward from a front end of a bottom wall portion 131 thereof and having an attachment hole 133 for attachment of the left-front pivot in the suspension arm SA, which passes completely therethrough in the front-rear direction, and a flange 134 continuous to an upper end of the vertical wall portion 132 and projecting forward. The attachment hole 133 faces the attachment hole 29 of the front member 20 at the front thereof. The attachment hole 133 can be omitted, when attachment strength of the left-front pivot in the suspension arm SA with respect to the attachment hole 29 of the front member 20 can be ensured sufficiently.

A left end of the left bracket 140 welded to the front member 20 is overlapped on an upper surface of the flange 134 of the left support member 130, and the flange 134 and the left end of the left bracket 140 are welded together typically by arc welding or the like.

A rear end of an upper left member 171 typically having a substantially U-shape in cross section, which is open downward, and provided in a protruding manner toward the front is overlapped on a lower surface of the flange 134 of the left support member 130, and the flange 134 and the rear end of the upper left member 171 are welded together typically by arc welding or the like. The upper left member 171 includes right and left pair of flanges 173, which are suspended downward from opposite ends in the width direction of an upper wall portion 172 thereof, and a bent portion 174 being a fragile portion. The bent portion 174 can be a portion that is buckled and deformed due to impulsive force typically applied at the time of frontal collision of the vehicle, and can absorb mechanical energy at the time of collision.

A lower left member 175 facing the upper left member 171 below thereof and typically having a substantially U-shape in cross section, which is open upward, and provided in a protruding manner toward the front is welded to the bottom wall portion 131 of the left support member 130, typically by, arc welding or the like. The lower left member 175 includes a bottom wall portion 176, and right and left pair of flanges 177 extending upward from opposite ends in the width direction of the bottom wall portion 176.

The right and left pair of flanges 173 of the upper left member 171 and the right and left pair of flanges 177 of the lower left member 175 are correspondingly welded together typically by arc welding or the like, and the upper left member 171 and the lower left member 175 form a box-shaped closed cross section. The upper left member 171 and the lower left member 175 constitute a left external-force receiving member 170. The left external-force receiving member 170 has a configuration of being welded to and integrally formed with the portion of the subframe 1 at the rear side thereof. However, the left external-force receiving member 170 can be attached thereto by a fastening member such as a bolt.

A right support member 150 provided in a protruding manner toward the front of the vehicle is welded to a right front end of the lower member 120 typically by arc welding or the like. The right support member 150 includes a vertical wall portion 152 extending upward from a front end of a bottom wall portion 151 thereof and having an attachment hole 153 for attachment of the right-front pivot in the suspension arm SA, which passes completely therethrough in the front-rear direction, and a flange 154 continuous to an upper end of the vertical wall portion 152 and projecting forward. The attachment hole 153 faces the attachment hole 35 of the front member 20 at the front thereof. The attachment hole 153 can be omitted, when attachment strength of the right-front pivot in the suspension arm SA with respect to the attachment hole 35 of the front member 20 can be ensured sufficiently.

A right end of the right bracket 160 welded to the front member 20 is overlapped on an upper surface of the flange 154 of the right support member 150, and the flange 154 and the right end of the right bracket 160 are welded together typically by arc welding or the like.

A rear end of an upper right member 181 typically having a substantially U-shape in cross section, which is open downward, and provided in a protruding manner toward the front is overlapped on a lower surface of the flange 154 of the right support member 150, and the flange 154 and the rear end of the upper right member 181 are welded together typically by arc welding or the like. The upper right member 181 includes right and left pair of flanges 183, which are suspended downward from opposite ends in the width direction of an upper wall portion 182 thereof, and a bent portion 184 being a fragile portion. The bent portion 184 can be a portion that is buckled and deformed due to impulsive force typically applied at the time of frontal collision of the vehicle, and can absorb mechanical energy at the time of collision.

A lower right member 185 facing the upper right member 181 below thereof and typically having a substantially U-shape in cross section, which is open upward, and provided in a protruding manner toward the front is welded to the bottom wall portion 151 of the right support member 150, typically by arc welding or the like. The lower right member 185 includes right and left pair of flanges 187 extending upward from opposite ends in the width direction of a bottom wall portion 186. The lower right member 185 includes a bottom wall portion 186, and right and left pair of flanges 187 extending upward from opposite ends in the width direction of the bottom wall portion 186.

The right and left pair of flanges 183 of the upper right member 181 and the right and left pair of flanges 187 of the lower right member 185 are correspondingly welded together typically by arc welding or the like, and the upper right member 181 and the lower right member 185 form a box-shaped closed cross section. The upper right member 181 and the lower right member 185 constitute a right external-force receiving member 180. The right external-force receiving member 180 has a configuration of being welded to and integrally formed with the portion of the subframe 1 at the rear side thereof. However, the right external-force receiving member 180 can be attached thereto by a fastening member such as a bolt.

In the upper member 100 and the lower member 120, a connection member 190 illustrated in detail particularly in FIG. 4 is attached to the left-rear attachment holes 113 and 122, and the right-rear attachment holes 114 and 123, and a left-rear suspension pivot of the suspension arm SA on the left side are also mounted via the connection member 190. The suspension arm SA on the left side and an attachment configuration thereof are mainly described here, but the suspension arm SA on the right side and an attachment configuration thereof have a bilaterally symmetric configuration with respect to the suspension arm SA on the left side.

Specifically, the connection member 190 includes a cylindrical portion 191 mounted with the left-rear suspension pivot of the suspension arm SA, a left bracket 192 fixedly arranged on a left outer periphery of the cylindrical portion 191, an upper right bracket 193 fixedly arranged on an upper right outer periphery of the cylindrical portion 191, and a lower right bracket 194 fixedly arranged on a lower right outer periphery of the cylindrical portion 191. The left bracket 192, the upper right bracket 193, and the lower right bracket 194 are acquired typically by press-molding a flat-plate member such as a steel plate, and are respectively welded to the outer periphery of the cylindrical portion 191 by arc welding or the like.

The left bracket 192 includes a notched portion 195 that extends in the width direction to open leftward and passes completely therethrough in the vertical direction. The notched portion 195 can be an attachment hole simply passing completely therethrough in the vertical direction, in terms of enabling attachment to the member on the vehicle body side. The upper right bracket 193 includes a through hole 196 passing completely therethrough in the vertical direction and fixedly arranged with a nut member (not shown) by welding or the like. The lower right bracket 194 includes a through hole (not shown) passing completely therethrough in the vertical direction.

The connection member 190 having such configuration is fastened by a fastening member such as a fastening bolt (not shown) and mounted on the upper member 100 and the lower member 120 via the left-rear attachment holes 113 and 122 of the upper member 100 and the lower member 120.

A spacer member 230 illustrated in detail in FIG. 5 is arranged with respect to the left-rear attachment holes 113 and 122, the left-rear through holes 115 and 124, the right-rear attachment holes 114 and 123, and the right-rear through holes 116 and 125, inside a space defined between the upper member 100 and the lower member 120.

Specifically, the spacer member 230 is acquired typically by press-molding a flat-plate member such as a steel plate, and includes a substantially cylindrical collar portion 231 respectively at opposite ends thereof, and also includes a flat-plate coupling portion 232 that couples these collar portions 231 in the longitudinal direction. The collar portion 231 is for receiving fastening axial force due to the fastening member such as a bolt for the left-rear suspension pivot of the suspension arm SA. The coupling portion 232 has a function of a reinforcing rib that couples the both collar portions 231 in the longitudinal direction, and contributes to improvement of stiffness of the subframe 1. Because the spacer member 230 is constituted typically by press-molding a flat-plate member such as a steel plate, the cost thereof is suppressed as compared with a spacer member made by forging. Further, because the two collar members 231 are formed by one flat-plate member, it also contributes to reduction of the number of constituent elements of the subframe 1.

Because the spacer member 230 receives the fastening axial force of the fastening member, the arrangement accuracy thereof may not necessarily be accurate, and further, welding thereof to the upper member 100 and the lower member 120 may not always be necessary. For example, the spacer member 230 can be provided with, for example, a convex portion 233 at the center of the lower part of the coupling portion 232, and the convex portion 233 can be positioned by inserting the convex portion 233 into a hole 126 provided in the bottom wall portion 121 of the lower member 120.

In the upper member 100 and the lower member 120, a hole OL located between the left-middle attachment hole 107 and the middle-left attachment hole 110 and passing completely through the upper member 100 and the lower member 120 is provided, and a hole OR located between the right-middle attachment hole 109 and the middle-right attachment hole 111 and passing completely through the upper member 100 and the lower member 120 is provided.

(Configuration of Respective Support Portions, Respective Attachment Portions, and the Like)

Regarding the above configuration, the configuration of the respective support portions, respective attachment portions, and the like are described below in detail, with reference to FIG. 4 and FIG. 5 in addition to FIGS. 1 to 3, while defining a correspondence relation between the respective support portions, respective attachment portions, and the like with the respective constituent elements.

In the subframe 1 having the above configuration, as portions mounted on a vehicle body, four portions, that is, a first attachment portion A1 and a second attachment portion A2 being right and left front attachment portions, and a third attachment portion A3 and a fourth attachment Portion A4 being right and left rear attachment portions are set. As portions that support the suspension arm SA, four portions, that is, a first support portion S1 and a second support portion S2 being right and left front support portions, and a third support portion S3 and a fourth support portion S4 being right and left rear support portions are set.

In the subframe 1, attachment portions for mounting various external-force application components and external-force receiving portions are set. As such various attachment portions, a steering-gearbox left attachment portion A5, a steering-gearbox right attachment portion A6, a stabilizer left attachment portion A7, a stabilizer right attachment portion A8, and a torque-rod attachment portion A9 can be mentioned. As the external-force receiving portions, a first external-force receiving portion C1 and a second external-force receiving portion C2 that respectively receive impulsive force typically applied at the time of frontal collision of the vehicle can be mentioned.

Specifically, the first attachment portion A1 is arranged corresponding to the left coupling member 270 fastened to the left auxiliary member 60 fixedly arranged to the left box-shaped portion 50 corresponding to the left projecting portion 24 of the front member 20. In the first attachment portion A1, a fastening member such as a bolt (not shown) is positioned on an upper part of the notched portion 272 of the left coupling member 270 and inserted into the left coupling member 270 and the attachment hole 62 provided in the vertical wall portion 61 of the left auxiliary member 60 and fastened, thereby mounting the left coupling member 270 on the subframe 1. A fastening member such as a bolt (not shown) is also mounted on a left front-side frame (not shown) on the vehicle body side via the attachment hole 273 of the left coupling member 270.

The second attachment portion A2 is arranged corresponding to the right coupling member 280 fastened to the right auxiliary member 90 fixedly arranged to the right box-shaped portion 80 corresponding to the right projecting portion 31 of the front member 20. In the second attachment portion A2, a fastening member such as a bolt (not shown) is positioned on an upper part of the notched portion 282 of the right coupling member 280 and inserted into the right coupling member 280 and the attachment hole 92 provided in the vertical wall portion 91 of the right auxiliary member 90 and fastened, thereby mounting the right coupling member 280 on the subframe 1. A fastening member such as a bolt (not shown) is also fitted to a right front-side frame (not shown) on the vehicle body side via the attachment hole 283 of the right coupling member 280.

The reason the notched portions 272 and 282 are provided in the first attachment portion A1 and the second attachment portion A2 is that the fastening member is moved downward along the notched portions 272 and 282, due to impulsive force applied to the subframe 1 typically at the time of frontal collision of the vehicle, in a state with the fastening member being fastened to the left auxiliary member 60 and the right auxiliary member 90, and detached from the left coupling member 270 and the right coupling member 280 to drop off therefrom. Correspondingly, the subframe 1 moves downward, thereby enabling to suppress the subframe 1 from thrusting into the vehicle interior.

The third attachment portion A3 is arranged corresponding to the left-rear through hole 115, to which the collar member 260 of the upper member 100 is fixedly arranged. The third attachment portion A3 is fastened to the left front-side frame by a fastening member such as a fastening bolt (not shown) via the collar member 260 and mounted on the vehicle body side.

The fourth attachment portion A4 is arranged corresponding to the right-rear through hole 116, to which the collar member 260 of the upper member 100 is fixedly arranged. The fourth attachment portion A4 is fastened to the right front-side frame by a fastening member such as a fastening bolt (not shown) via the collar member 260 and mounted on the vehicle body side.

The first support portion S1 is arranged corresponding to the first opening portion that is open outward, which is defined between the left-end vertical wall portion 28 in the front member 20 and the vertical wall portion 132 in the left support member 130. In the first support portion S1, the left-front pivot in the suspension arm SA is fastened and mounted by a fastening member such as a fastening bolt (not shown) via the attachment hole 29 provided in the left-end vertical wall portion 28 and the attachment hole 133 provided in the vertical wall portion 132. The left-front pivot is a suspension pivot located facing the right side of a suspension pivot on the left-front wheel side (not shown), defines the position of the left-front wheel in the vehicle width direction, and applies relatively large external force mainly in the vehicle width direction with respect to the body portion. As a typical configuration of the left-front pivot, an insulator bush member having a configuration in which a rubber portion is bonded to the collar member, into which the fastening member thereof is inserted, and having a small spring constant in the longitudinal direction and a large spring constant in the vehicle width direction can be mentioned.

The second support portion S2 is arranged corresponding to the second opening portion that is open outward, which is defined between the right-end vertical wall portion 34 in the front member 20 and the vertical wall portion 152 in the right support member 150. In the second support portion S2, the right-front pivot in the suspension arm SA is fastened and mounted by a fastening member such as a fastening bolt (not shown) via the attachment hole 35 provided in the right-end vertical wall portion 34 and the attachment hole 153 provided in the vertical wall portion 152. The right-front pivot is a suspension pivot located facing the left side of a suspension pivot on the right-front wheel side (not shown), defines the position of the right-front wheel in the vehicle width direction, and applies relatively large external force mainly in the vehicle width direction with respect to the body portion 10. As a typical configuration of the right-front pivot, an insulator bush member having a configuration in which a rubber portion is bonded to the collar member, into which the fastening member thereof is inserted, and having a small spring constant in the longitudinal direction and a large spring constant in the vehicle width direction can be mentioned.

Because the first support portion Si and the second support portion S2 are respectively provided on both the right and left sides, an input load from the front of the vehicle at the time of frontal collision of the vehicle can be evenly received by these support portions, and a deformation mode on the right and left portions of the subframe 1 can be equalized. In addition, because the left bracket 140 and the right bracket 160 are members separate from each other, occurrence of such a circumstance that when there is a load input from either side of the right and left sides at the time of steering, the load is transmitted to the other side can be suppressed, thereby enabling to improve steering characteristics of the vehicle.

The third support portion S3 is arranged corresponding to the left-rear attachment holes 113 and 122 of the upper member 100 and the lower member 120, and corresponding to the connection member 190 that connects the upper member 100 and the lower member 120 to the left front-side frame on the vehicle body side. In the third support portion S3, the connection member 190 is fastened by a fastening member such as a fastening bolt (not shown) and mounted on the subframe 1, respectively via the through hole 196 of the upper right bracket 193 and a through hole (not shown) of the lower right bracket 194, which are correspondingly position-matched with the left-rear attachment holes 113 and 122 of the upper member 100 and the lower member 120, in a state with the left-rear suspension pivot of the left suspension arm SA being press-fitted and mounted on the cylindrical portion 191 provided in the connection member 190. The connection member 190 is also fastened by a fastening member such as a fastening bolt (not shown) and mounted on the left front-side frame via the notched portion 195 of the left bracket 192.

In the third support portion S3, because the left bracket 192 has the notched portion 195, the left bracket 192 is moved rightward to drop off from the fastening member inserted into the notched portion 195 due to impulsive force applied to the subframe 1 typically at the time of frontal collision of the vehicle, thereby detaching the connection member 190 from the left front-side frame. Correspondingly, the subframe 1 moves downward, thereby enabling to suppress the subframe 1 from thrusting into the vehicle interior.

The fourth support portion S4 is arranged corresponding to the right-rear attachment holes 114 and 123 of the upper member 100 and the lower member 120, and corresponding to the connection member that connects the upper member 100 and the lower member 120 to the right front-side frame on the vehicle body side. In the fourth support portion S4, the connection member is mounted on the subframe 1 and the right front-side frame in the same manner as in the third support member S3, in a state with the right-rear suspension pivot of the right suspension arm SA being press-fitted and mounted on the cylindrical portion provided in the connection member (not shown), for which the connection member 190 in the third support portion S3 is horizontally reversed and used. The connection member can be detached from the right front-side frame when impulsive force is applied typically at the time of frontal collision of the vehicle.

The right and left suspension arms SA are typically a front-suspension L-type lower arm. In this case, the left-rear suspension pivot and the right-rear suspension pivot are compliance bush members having a configuration in which a rubber portion is bonded to a collar member, which is inserted into a shaft portion integrated with the suspension arm SA, and having a small spring constant in the front-rear direction and a large spring constant in the vertical direction and the vehicle width direction.

Further, by providing the spacer member 230 so as to connect between the third support portion S3 and the third attachment portion A3, and between the fourth support portion S4 and the fourth attachment portion A4, deformation of these portions can be suppressed at the time of collision of the vehicle, and when the third support portion S3 and the fourth support portion S4 drop off downward, occurrence of such a circumstance that the deformation interrupts the drop-off thereof can be suppressed.

The steering-gearbox left attachment portion A5 is arranged corresponding to the left-front through hole 102, to which the collar member 250 of the upper member 100 is fixedly arranged. The steering-gearbox right attachment portion A6 is arranged corresponding to the right-front through hole 103, to which the collar member 250 of the upper member 100 is fixedly arranged. In the steering-gearbox left attachment portion A5 and the steering-gearbox right attachment portion A6, a steering gearbox (not shown) is fastened and mounted by a fastening member such as a fastening bolt (not shown) respectively via the collar members 250 and 250. According to the specification of the steering gearbox, the middle-left attachment hole 110 and the middle-right attachment hole 111 of the upper member 100 can be used correspondingly as the attachment portion.

The stabilizer left attachment portion A7 is arranged corresponding to the left-front attachment hole 106 and the left-middle attachment hole 107 of the upper member 100, and the stabilizer sight attachment portion A8 is arranged corresponding to the right-front attachment hole 108 and the right-middle attachment hole 109 of the upper member 100. In the stabilizer left attachment portion A7 and the stabilizer right attachment portion A8, a bar-like stabilizer (not shown) is fastened and mounted by a fastening member such as a fastening bolt (not shown) together with an attachment bracket, respectively via the left-front attachment hole 106 and the left-middle attachment hole 107, and the right-front attachment hole 108 and the right-middle attachment hole 109. The stabilizer is typically a bar-like member, and is routed in a mode in which at least a part of the vertical cross section is accommodated in the rear concave portion 112 provided in the upper member 100, passing therethrough in the width direction, and the steering gearbox is located in an upper part thereof.

The torque-rod attachment portion A9 is arranged corresponding to the central portion 21 of the front member 20, the front concave portion 104 of the upper member 100, and the mounting bracket 240. In the torque-rod attachment portion A9, a torque rod being a mounting member of an engine transmission system (both not shown) is fastened and mounted by a fastening member such as a fastening bolt, via the front-middle attachment hole 105 and the nut member 265. The torque rod typically has a configuration in which a rubber portion is bonded to a collar member, into which a fastening member thereof is inserted, to suppress movement of the engine transmission system in which a spring constant in the vertical direction is set small and a spring constant in the longitudinal direction and the vehicle width direction is set large. The torque rod is coupled to a case of the engine transmission system via a member (not shown) made of metal such as a steel material.

The first external-force receiving portion C1 is set corresponding to a front end of the left external-force receiving member 170 configured by the upper left member 171 and the lower left member 175. At the time of application of impulsive force from the front of the vehicle to the first external-force receiving portion C1, which is typically applied at the time of frontal collision of the vehicle, the left external-force receiving member 170 crushes, while being compressed rearward, and bends downward with the bent portion 174 being the bending point, thereby absorbing energy and enabling to reduce input of the impulsive force to the portion of the subframe 1 at the rear side thereof.

The second external-force receiving portion C2 is set corresponding to a front end of the right external-force receiving member 180 configured by the upper right member 181 and the lower right member 185. At the time of application of impulsive force from the front of the vehicle to the second external-force receiving portion C2, which is typically applied at the time of frontal collision of the vehicle, the right external-force receiving member 180 crushes, while being compressed rearward, and bends downward with the bent portion 184 being the bending point, thereby absorbing energy and enabling to reduce input of the impulsive force to the portion of the subframe 1 at the rear side thereof.

The various nut members and collar members described above are typically made of metal such as a steel material.

In the present embodiment including the various modifications described above, the suspension arm SA can be other than the L-type suspension arm so long as it has the same function.

In the present invention, the type, the form, the arrangement, the number, and the like of the constituent members are not limited to those in the embodiment explained above, and it is needless to mention that the constituent elements can be modified as appropriate without departing from the scope of the invention, such as appropriately replacing these elements by other ones having identical operational effects.

INDUSTRIAL APPLICABILITY

As described above, the present invention can provide a vehicle subframe that can improve support stiffness of a suspension while ensuring favorable productivity, high strength, and the like, with a simple configuration. Therefore, because of its general purposes and universal characteristics, applications of the present invention can be expected in a wide range in the field of a subframe of a vehicle body of a movable body such as a vehicle.

The invention claimed is:

1. A vehicle subframe comprising:
   a lower member being a plate-like member located on a lower side of a vehicle body;
   an upper member being a plate-like member facing the lower member on an upper side of the vehicle body; and
   a front member being a plate-like member located on a front side of the vehicle body of the lower member and the upper member, wherein
   the front member is intervened between an end on the front side of the vehicle body of the lower member and an end on the front side of the upper member to connect therebetween, and an end on a rear side of the vehicle body of the lower member and an end on the rear side of the upper member are connected with each other, to constitute a body portion exhibiting a closed sectional shape closed in a front-rear direction and in a vertical direction of the vehicle body,
   the front member includes a pair of right and left projecting portions projecting from the body portion in a width direction of the vehicle body,
   each of the projecting portions extends toward the upper side, while projecting from the body portion in the width direction, to have an upper end, and exhibiting a convex shape to the front side, with the upper end functioning as a front attachment portion to the vehicle body, and
   each of the projecting portions includes an upper wall having the upper end, a lower wall opposed to the upper wall, and a side wall connecting the upper wall and the lower wall, and respective ends of the upper wall, the lower wall, and the side wall of each of the projecting portions are connected to a reinforcing member fixed to the body portion, to form a closed cross section.

2. The vehicle subframe according to claim 1, wherein
   a coupling member is further provided between the front attachment portion and the vehicle body, and
   the coupling member includes a notched portion for fastening with the vehicle body, formed so as to be open downward.

3. The vehicle subframe according to claim 2, wherein the projecting portion further includes a vertical wall portion on the front side, and the vertical wall portion and a support member provided in a protruding manner from the body portion toward the front side constitute a front support portion that supports a suspension arm.

4. The vehicle subframe according to claim 2, wherein the upper member and the lower member are cooperatively to constitute a rear attachment portion being an attachment portion to the vehicle body on the rear side, and a rear support portion being a support portion of a suspension arm on the rear side.

5. The vehicle subframe according to claim 2, wherein the upper member further includes a dent portion for routing a stabilizer, which is provided by depressing the upper member downward.

6. The vehicle subframe according to claim l, wherein the projecting portion includes a vertical wall portion on the front side, and the vertical wall portion and a support member provided in a protruding manner from the body portion toward the front side constitute a front support portion that supports a suspension arm.

7. The vehicle subframe according to claim 6, further comprising an external-force receiving member provided in a protruding manner from the support member toward the front side.

8. The vehicle subframe according to claim 7, wherein the upper member and the lower member are cooperatively to constitute a rear attachment portion being an attachment portion to the vehicle body on the rear side, and a rear support portion being a support portion of the suspension arm on the rear side.

9. The vehicle subframe according to claim 7, wherein the upper member further includes a dent portion for routing a stabilizer, which is provided by depressing the upper member downward.

10. The vehicle subframe according to claim 6, wherein the upper member and the lower member are cooperatively to constitute a rear attachment portion being an attachment portion to the vehicle body on the rear side, and a rear support portion being a support portion of the suspension arm on the rear side.

11. The vehicle subframe according to claim 6, wherein the upper member further includes a dent portion for routing a stabilizer, which is provided by depressing the upper member downward.

12. The vehicle subframe according to claim 1, wherein the upper member and the lower member are cooperatively to constitute a rear attachment portion being an attachment portion to the vehicle body on the rear side, and a rear support portion being a support portion of a suspension arm on the rear side.

13. The vehicle subframe according to claim 12, further comprising a spacer member arranged across the rear attachment portion and the rear support portion, wherein
the spacer member includes a first collar portion arranged in the rear attachment portion, a second collar portion arranged in the rear support portion, and a coupling portion that couples the first collar portion and the second collar portion.

14. The vehicle subframe according to claim 13, wherein
a connection member is further provided between the rear support portion and the vehicle body, and
the suspension arm is supported by the rear support portion and the connection member.

15. The vehicle subframe according to claim 12, wherein
a connection member is further provided between the rear support portion and the vehicle body, and
the suspension arm is supported by the rear support portion and the connection member.

16. The vehicle subframe according to claim 1, wherein the upper member further includes a dent portion for routing a stabilizer, which is provided by depressing the upper member downward.

* * * * *